United States Patent [19]
Gantert

[11] 3,858,803
[45] Jan. 7, 1975

[54] VEHICLE WHEEL TRACTION MAT
[76] Inventor: Alfred Gantert, 5620 East Lakeshore Dr., Wonder Lake, Ill. 60097
[22] Filed: Aug. 15, 1973
[21] Appl. No.: 388,467

[52] U.S. Cl. .................................. 238/14, 15/239
[51] Int. Cl. ............................................ E01b 23/00
[58] Field of Search ......... 15/238, 239, 241; 238/14

[56] References Cited
UNITED STATES PATENTS
| 760,101 | 5/1904 | Burnell | 15/239 |
| 839,059 | 12/1906 | Doebler | 15/241 |
| 1,465,550 | 8/1923 | Hayden | 15/239 |
| 1,683,411 | 9/1928 | Remmers | 238/14 |
| 1,779,414 | 10/1930 | Ames | 15/239 |

Primary Examiner—M. Henson Wood, Jr.
Assistant Examiner—Richard A. Bertsch
Attorney, Agent, or Firm—Hill, Gross, Simpson, Van Santen, Steadman, Chiara & Simpson

[57] ABSTRACT

A traction mat especially suitable for use under a vehicle wheel comprises a series of articulated serpentine traction strips with at least certain of the strips having superior traction edge projections. The mat can be compactly rolled for storage.

20 Claims, 6 Drawing Figures

VEHICLE WHEEL TRACTION MAT

This invention relates to traction mats especially suitable for use under vehicle wheels to provide emergency traction under conditions such as snow, ice, sand, clay, loose soil, and the like.

Numerous and varied wheel traction assistance structures have been suggested heretofore, but have suffered from anyone or more of a number of shortcomings among which may be mentioned unduly high cost so as to be unattractive economically, permanent deformability under wheel weight, dangerous cutting edges or sharp points that may injure the users hands or other objects during handling or in storage, bulkiness or unwieldiness for storage purposes, difficult to clean, relative ineffectiveness under unusual circumstances such as deep snow, mud or sand, and the like.

It is accordingly an important object of the present invention to overcome the foregoing and other disadvantages, defects, deficiencies, inefficiencies, shortcomings and problems inherent in prior structures and to attain important improvements and advantages in a new and improved vehicle traction mat as will hereinafter become apparent.

Another object of the invention is to provide a vehicle wheel traction mat of exceptional efficiency, easy handling, rugged construction, indefinite reusability, and low cost.

A further object of the invention is to provide a new and improved vehicle wheel traction mat which can be neatly rolled into a small bundle for storage and handling.

Still another object of the invention is to provide a new and improved vehicle wheel traction mat which can be easily and effectively cleaned after use.

Other objects, features and advantages of the invention will be readily apparent from the following description of certain preferred embodiments thereof, taken in conjunction with the accompanying drawing although variations and modifications may be effected without departing from the spirit and scope of the novel concepts embodied in the disclosure, and in which.

Figure 1:
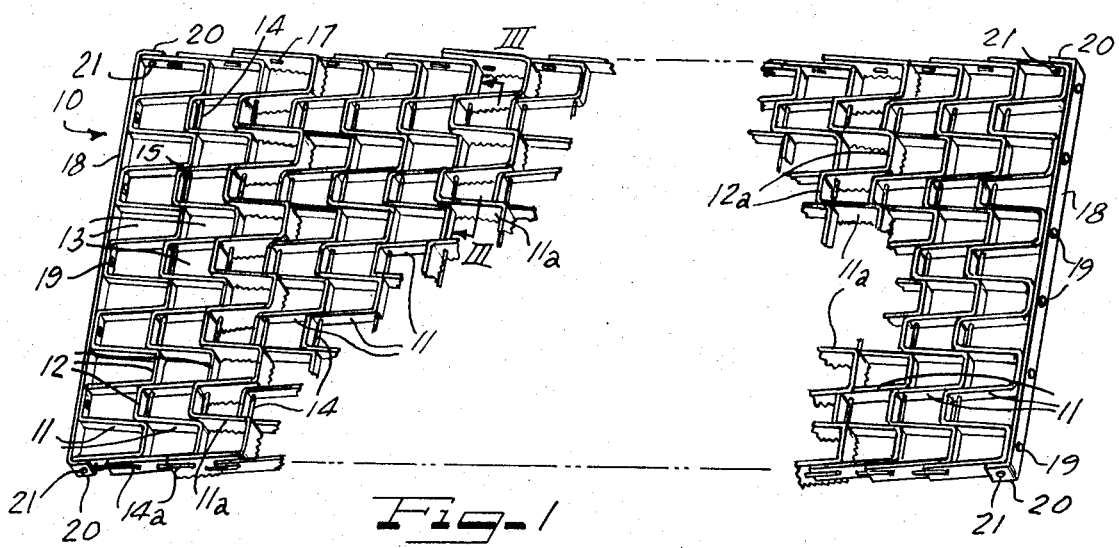
FIG. 1 is a fragmental isometric view of a vehicle wheel traction mat embodying features of the invention.
Figure 4:
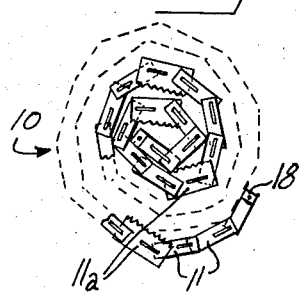
FIG. 4 is a schematic side elevational view of the mat in rolled-up condition in a small bundle for storage.

As shown in FIG. 1, a traction mat embodying features of the invention involves certain basic structural features found in the well known flexible metallic door mats used in association with entrance doors of buildings and other places to provide a convenient walking surface for catching mud, dirt and snow from the shoes of persons walking thereon. Such mats are necessarily constructed with uniformly plane upper and lower faces. Similar to the door mat construction, the traction mat 10 comprises a series of serpentine traction strips 11 which may be formed from suitable material such as sheet or plate metal, high impact strength plastic and the like. Each of these strips 11 has alternately oppositely projecting undulations 12 defining therebetween corresponding oppositely opening indentations 13. In the illustrated instance, the undulations 12 are of regular generally U-shape with the leg portions of each of the U's slightly divergent so that the crest portions of the undulations can fit interdigitally by projecting into the mouth ends of the indentations 13. In the mat 10, the crest portions of the undulations face generally toward the opposite ends of the mat and the leg portions of the undulations face generally toward the sides of the mat. For flexibility of the mat, the interdigited crest portions of the undulations 12 are articulately coupled by means of suitable hinge pin rods 14 desirably formed from suitable gauge wire and extending through aligned holes 15 in the sides of the crest portions of the undulations. To retain the rods 14 against endwise displacement, they are provided with means at their opposite ends comprising locking terminals 14a bent to extend longitudinally long the outer side of the mat and suitably interlocked as at 17 with the outermost undulation leg of one of the coupled traction strips. Through this arrangement, the traction strips 11 are connected into a flexible mat form which permits the mat to be rolled up into a compact bundle for storage as shown in FIG. 4 and to be readily rolled out for use as required. Further, the articulated construction facilitates cleaning of the mat by shaking it, thrashing it against a surface, and the like.

For ruggedness at each opposite end of the mat 10, reinforcing and stabilizing means such as a closure strip bar 18 may be provided and which may be formed from the same strip material as the traction strips 11 or may be of a slightly heavier gauge if preferred. Each of the end bars 18 is secured to the crests of the endmost undulations 12 of the mat as by means of rivets 19. Reinforcing means at the opposite ends of the bars 18 may comprise respective turned terminal flanges 20 thereon which lap the adjacent outer sides of the side most traction strip undulations and may be secured thereto as by means of rivets 21. In the mat 10 as thus constructed, the upper and lower edges of the traction strips 11 and the bars 18 cooperate to provide upper and lower traction mat faces.

For improved traction reliability in association with vehicle wheels, the mat 10 is provided with means at least at one of its faces to attain superior traction. To this end, improved gripping of the underlying surface (including mud, sand, snow, ice, etc.) is attained by providing at least certain of the transverse articulately connected strips, identified as 11a and which are in general respects the same as the companion serpentine track strips 11, with superior traction edge portions 22 projecting downwardly beyond the face plane of the strips 12. To improve their gripping function, the projections 22 are desirably in the form of generally saw tooth prongs extending seriatim throughout the extent of the lower edges of the strips 11a so that not only the lower edges of the crests but also the lower edges of the side walls of the undulations 12a of the strips 11a have the saw tooth projections 22 providing excellent traction gripping against slipping not only for and aft but also toward either side of the mat. To enhance their effectiveness and durability, the gripping prongs 22 are relatively short compared to root width, and the strips 11a are of extended width downwardly relative to the companion strips 11, thereby providing continuous downwardly projecting traction flanges 23 for the mat 10, with the projections 22 providing superior traction gripping. In a desirable construction, as shown, the flange 23 of each of the strips 11a may have an unbroken solid width at least equal to the length of the prongs 22. Although for extremely severe hard ice conditions, it may be desirable to construct the mat 10 entirely from the traction strips 11a or to have every alternate one of the strips in the mat of the 11a type, for general utility, every third or fourth of the strips in the mat may be one of the strips 11a. For snow and loose dirt, mud or sand conditions, ditch or gully caught wheel, and like conditions, the spaced arrangement of the strips 11a along the length of the mat has advantages since the strips 11a can then function as cleats along the lower face of the mat.

Even though good results can be realized by having the upper face of the mat 10 of generally uniform plane, improved traction engagement with a vehicle wheel tire is attained by providing the strips 11a with upward traction edge projections 24, preferably in the form of a continuous flange which may have its upper edge in a common plane, but which may be of vertically undulating form to provide a series of blunt upward projections such as one such projection for each undulation crest rather than a plurality of saw tooth projections such as the teeth 22, thereby preventing injury to rubber tire treads.

Figure 2:
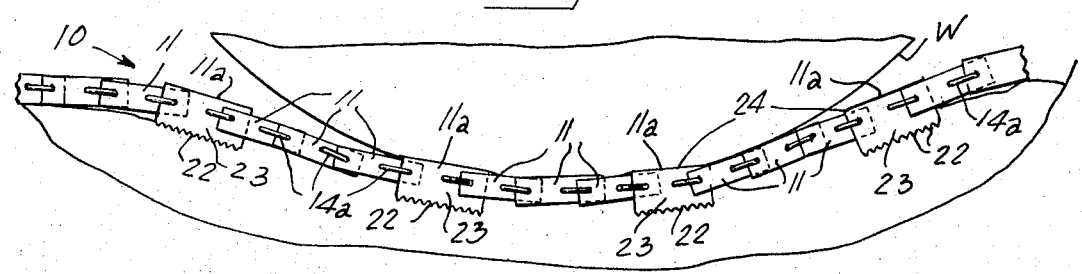
FIG. 2 is a fragmentary enlarged side elevational view of the mat demonstrating its use.
Figure 3:
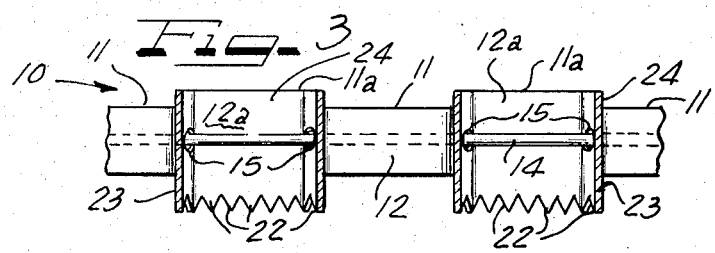
FIG. 3 is an enlarged fragmentary sectional elevational detail view taken substantially along the line III—III of FIG. 1.

In use of the mat 11, one end is placed in touch association with the rubber tire of a wheel W (FIG. 2) for which traction aid is desired. As power is applied to the wheel, the tire treads will engage with the end portion of the mat and either climb onto it or pull it further under the wheel until the cleat flanges 23 catch in the underlying material or surface, anchoring the mat and enabling the wheel to roll on over the upper traction surface of the mat, aided by the projecting flanges 24 which press up into the tire tread for increased traction, as exemplified in FIG. 2. Such an arrangement is especially satisfactory where the wheel W must negotiate a relatively steep incline or grade to reach a level surface or at least a surface of a grade which will provide adequate traction for the wheel, considering the particular surface conditions at the time.

For automobile tires, the mat 10 may be from 8 to 9 inches wide and about 3 feet in length. For heavy-duty trucks, a width of about 12 inches by 6 feet may be required. To meet unusual conditions, a plurality of the mats 10 may be laid end to end. Sometimes only one of the driving wheels of a vehicle loses traction and requires traction assistance, and then only one of the mats 10 will suffice, but often both of a pair of traction wheels may require assistance and then two of the mats 10 may be used. By reason of the open mesh or reticulated arrangement effected by the articulatedly connected traction strips of the mat 10, maximum traction area is afforded by the mat with minimum weight. Further, by reason of the articulated connection of the mat strips 11, 11a, the mat can be rolled up into a relatively compact bundle as shown in FIG. 4. This permits one or more of the mats to be conveniently stored in a vehicle such as in the storage trunk, leaving maximum storage area free for other uses, avoiding disturbance of other articles in the storage space when it is necessary to remove the traction mat for use. After use, the traction mat can be easily cleaned of any snow or dirt, by shaking it out, striking it against an unyielding surface, and the like, whereafter the mat can again be rolled up and returned to storage with minimum liability of transferring snow, ice or dirt into the storage space on the mat.

In a typical construction, the width of the strips 11 may be about three-eighth of an inch and the strips 11a about three-fourth inch in width, with the undulations 12, 12a about 1 ½ to 2 inches long, the flanges 24 projecting upwardly about one-eighth inch and the flanges 23 with the teeth 22 projecting downwardly about one-fourth inch. Spacing of the strips 11a inwardly from the ends of the mat 10 may be about 3 to 6 inches and the space between the successive strips 11a about 6 to 8 inches, as preferred. In order to facilitate initial placement of the mat under a vehicle tire the traction strips 11a nearest the ends of the mat may have only the upwardly projecting superior traction flange 24, with the next succeeding and remaining of the traction strips 11a provided with both the upward and downward superior traction projections.

Figure 5:
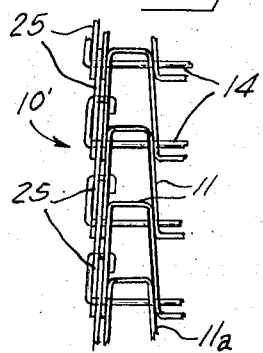
FIG. 5 is a fragmentary plan view of the mat showing a modification.
Figure 6:
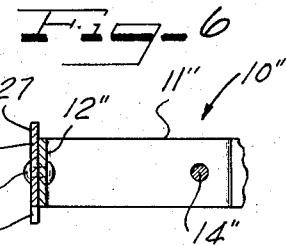
FIG. 6 is a fragmentary sectional detail view of the mat showing another modification.

For heavy duty purposes, such as for trucks, the mat may require additional reinforcement along the sides. For this purpose, the arrangements shown in FIG. 5 may be employed wherein the mat 10 has a reinforcing side closure plates 25 in articulated connection with the outer end portions of the connecting rods 14 and along side the outer most legs of the undulations of the transverse strips 11 and 11a.

Where increased traction is desired at one or both opposite ends of the traction mat, a modification of the end closure plates strip 18 may be provided as represented in FIG. 6. Thus, the mat 10'' which may be in other respects similar as already described, is provided with a closure strip 18'' secured as by means of rivets 19'' to the undulations 12'' of the endmost traction strip 11'' and either the upper or lower or both edges of the strip 11'' may project beyond the adjacent edges of the strip 11''. Thus, the strip 18'' may be provided be, an upwardly projecting superior traction flange 27 may be for example, of about ⅛ inch height above the edge of the strip 11''. Alternatively in addition to the upper projection 27, the strip 18'' may be provided with a downward superior traction projection 28 which may be in the form of teeth similar to the traction teeth 22 or merely a solid downward projection of the strip 18''.

It will be understood that variations and modifications may be effected without departing from the spirit and scope of the novel concepts of this invention.

I claim as my invention:

1. A traction mat having opposite sides and opposite ends and especially suitable for use to provide efficient traction under a vehicle wheel, comprising:

a series of substantially rigid serpentine traction strips extending between said sides and having alternately oppositely projecting undulations and intervening oppositely opening indentations defined by crest portions which face generally toward said ends and leg portions which face generally toward said sides;

the crest portions of the undulations being interdigitated by projecting into the mouth ends of the indentations;

means articulately coupling the interdigitated crest portions of the undulations and thereby connecting the strips into flexible mat form and providing upper and lower traction mat faces along the opposite edges of the strips;

certain of the strips being of minor width;

others of the strips being substantially wider than said minor width strips;

and a plurality of the narrower strips intervening between adjacent width strips;

whereby the wider strips provide superior traction projections from at least one of said faces of the mat.

2. A traction mat according to claim 1, wherein said wider strips project above the upper face of the mat.

3. A traction mat according to claim 1, wherein said wider strips project below the lower face of the traction mat.

4. A traction mat according to claim 3, wherein said wider strips have closely spaced teeth on their lower edges extending entirely along the lower edges including the crest portions and the leg portions of the wider strips.

5. A traction mat according to claim 1, wherein said wider strips project both above the upper face of the mat and from tne lower face of the mat.

6. A traction mat according to claim 5, wherein the upper edges of the wider strips are in a common plane and the lower edges of the wider strips have traction improving teeth thereon.

7. A traction mat according to claim 5, wherein the wider strips extend to a greater width below the lower face of the mat than the wider strips extend above the upper face of the mat.

8. A traction mat according to claim 1, said coupling means comprising rods which extend through holes in the sides of the crest portions and have locking terminals which are bent to extend longitudinally along the outer sides of the mat and have ends which are interlocked with the outermost legs of the strips coupled by the rods.

9. A traction mat according to claim 8, including reinforcing side closure plates in articulated connection with the connecting rods along the sides of the mat and the terminal portions of the rods connecting said side plates to the sides of the mat.

10. A traction mat according to claim 1, including an end closure strip engaging the crests of the traction strips at least at one end of the mat, said end closure strip having a traction flange portion at least along one edge which projects from the adjacent traction mat face to improve traction at that end of the mat.

11. A traction mat having opposite sides and opposite ends and especially suitable for use to provide efficient traction under a vehicle wheel, comprising:

a series of substantially rigid serpentine traction strips extending between said sides and having alternately oppositely projecting undulations and intervening oppositely opening indendations defined by crest portions which face generally toward said ends and leg portions which face generally toward said sides;

the crest portions of the undulations being interdigitated by projecting into the mouth ends of the indentations;

means articulately coupling the interdigitated crest portions of the undulations and thereby connecting the strips into flexible mat form and providing upper and lower traction mat faces along the opposite edges of the strips;

at least certain of the strips having superior traction edge projection flange structure on said crest portions and on said leg portions and extending upwardly above the general upper face plane of the mat; and said certain strips being spaced from one another longitudinally along the mat, and with a majority of the traction strips intervening between the spaced certain strips and defining said general upper face plane.

12. A traction mat according to claim 11, wherein said projection flange structure comprises a continuous flange on each of said certain strips.

13. A traction mat having opposite sides and opposite ends and especially suitable for use to provide efficient traction under a vehicle wheel, comprising:

a series of substantially rigid serpentine traction strips extending between said sides and having alternately oppositely projecting undulations and intervening oppositely opening indentations defined by crest portions which face generally toward said ends and leg portions which face generally toward said sides;

the crest portions of the undulations being interdigitated by projecting into the mouth ends of the indentations;

means articulately coupling the interdigitated crest portions of the undulations and thereby connecting the strips into flexible mat form and providing upper and lower traction mat faces along the opposite edges of the strips;

at least certain of the strips having superior traction edge projection flange structure on said crest portions and on said leg portions and extending downwardly from the general lower face plane along the lower face of the mat; and said certain strips being spaced from one another longitudinally along the mat, with a majority of the traction strips intervening between the spaced certain strips and defining said general lower face plane.

14. A traction mat according to claim 13, wherein said flange structure includes a series of downwardly projecting traction teeth.

15. A traction mat according to claim 14, wherein said teeth are of generally saw tooth form projecting downwardly at uniform intervals along the lower edges of the crest portions and the leg portions of said certain strips and provide effective traction grip against displacement of the mat both longitudinally and laterally.

16. A traction mat according to claim 13, wherein said traction edge projection flange structure comprises a continuous flange on each of said certain strips.

17. A traction mat according to claim 13, wherein said coupling means comprise rods which extend through holes in the sides of the crest portions and having locking terminals which are bent to extend longitudinally along the outer sides of the mat and have ends which are interlocked with the outermost legs of the strips coupled by the rods.

18. A traction mat according to claim 17, including reinforcing side closure plates in articulated connection with the connecting rods along the sides of the mat and the terminal portions of the rods connecting said side plates to the sides of the mat.

19. A traction mat having opposite sides and opposite ends and especially suitable for use to provide efficient traction under a vehicle wheel, comprising:
- a series of substantially rigid serpentine traction strips extending between said sides and having alternately oppositely projecting undulations and intervening oppositely opening indentations defined by crest portions which face generally toward said ends and leg portions which face generally toward said sides;
- the crest portions of the undulations being interdigitated by projecting into the mouth ends of the indentations;
- means articulately coupling the interdigitated crest portions of the undulations and thereby connecting the strips into flexible mat form and providing upper and lower traction mat faces along the opposite edges of the strips;
- certain of the strips being of minor width;
- others of the strips being substantially wider than said minor width strips;
- and said wider strips being spaced from one another by at least one minor width strip intervening between the wider strips;
- said wider strips projecting both above the upper face of the mat and below the lower face of the mat;
- said wider strips extending to a greater width below the lower face of the mat than they extend above the upper face of the mat;
- whereby the wider strips provide superior traction projections from at least one of said faces of the mat.

20. A traction mat having opposite sides and opposite ends and especially suitable for use to provide efficient traction under a vehicle wheel, comprising:
- a series of substantially rigid serpentine traction strips extending between said sides and having alternately oppositely projecting undulations and intervening oppositely opening indentations defined by crest portions which face generally toward said ends and leg portions which face generally toward said sides;
- the crest portions of the undulations being interdigitated by projecting into the mouth ends of the indentations;
- means articulately coupling the interdigitated crest portions of the undulations and thereby connecting the strips into flexible mat form and providing upper and lower traction mat faces along the opposite edges of the strips;
- certain of the strips being of minor width;
- others of the strips being substantially wider than said minor width strips;
- and said wider strips being spaced from one another by at least one minor width strip intervening between the wider strips;
- whereby the wider strips provide super traction projections from at least one of said faces of the mat;
- and an end closure strip engaging the crests of the traction strips at least at one end of the mat, said end closure strip having a traction flange portion at least along one edge which projects from the adjacent traction mat face to improve traction at that end of the mat.

* * * * *